Aug. 12, 1952 T. C. GILES 2,606,742
BLADES OF AXIAL FLOW COMPRESSORS AND TURBINES
AND THE MEANS OF FIXING THEM
Filed March 29, 1948 2 SHEETS—SHEET 2
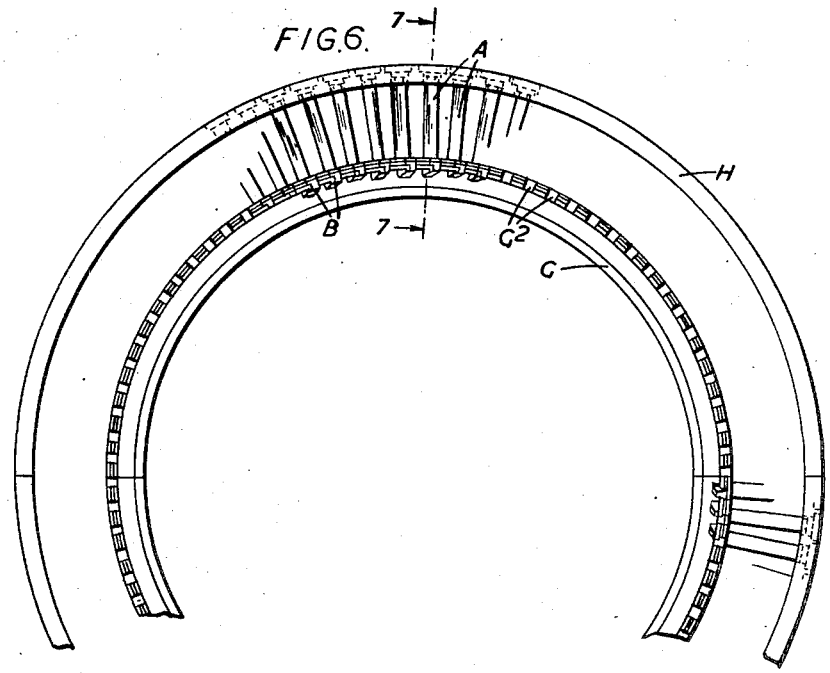
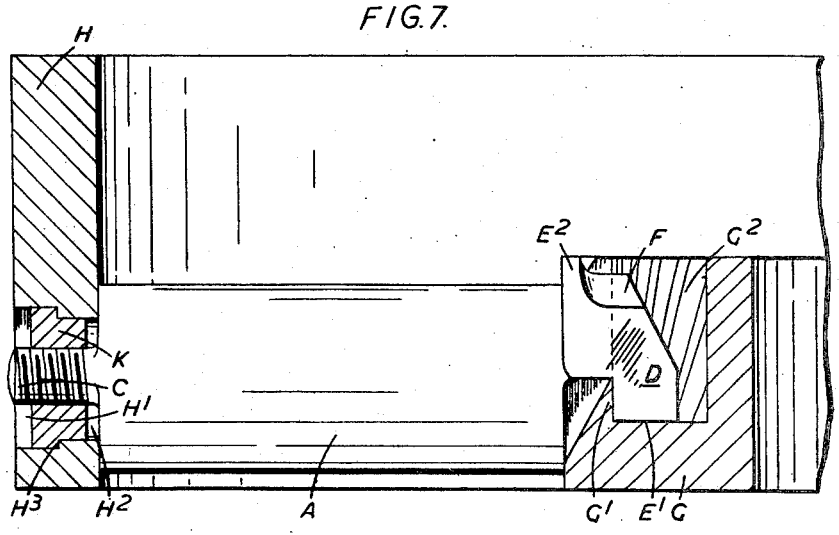
Inventor
Thomas Charles Giles
by Emery, Holcombe & Blair
Attorneys Patented Aug. 12, 1952

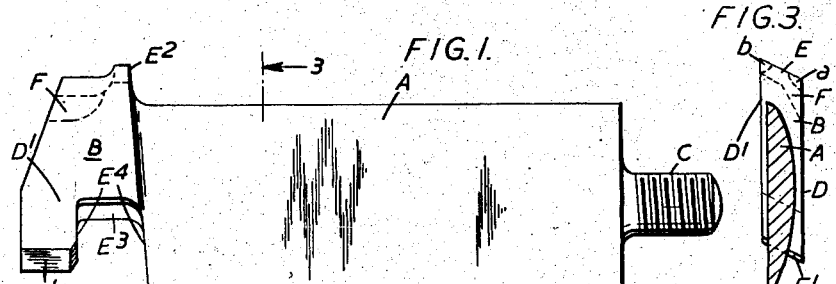
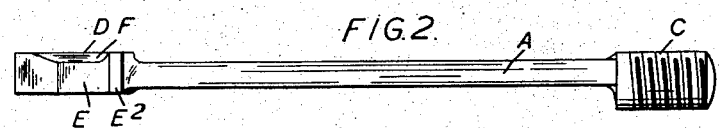
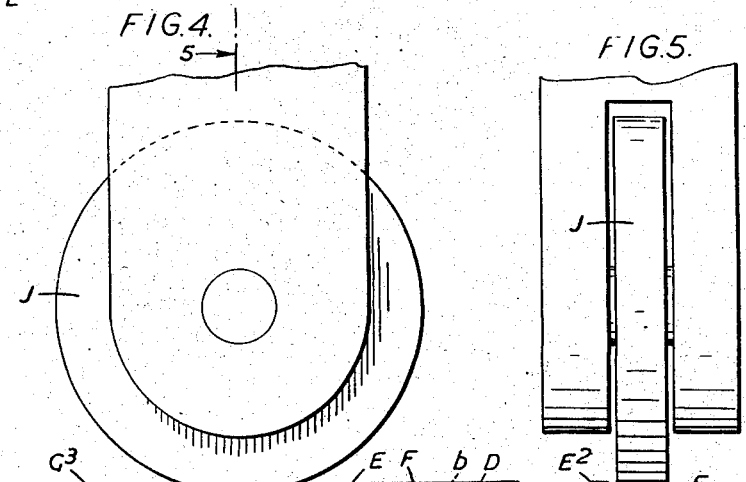
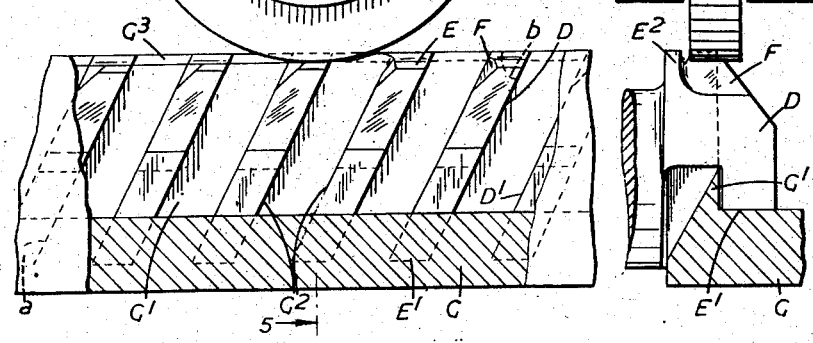

2,606,742

UNITED STATES PATENT OFFICE 2,606,742

BLADES OF AXIAL FLOW COMPRESSORS AND TURBINES AND THE MEANS OF FIXING THEM

Thomas Charles Giles, Middlesex, England, assignor to D. Napier & Son Limited, London, England, a company of Great Britain Application March 29, 1948, Serial No. 17,768
In Great Britain April 3, 1947

5 Claims. (Cl. 253—77)

This invention relates to the blades of axial flow compressors and turbines, and the means for fixing them, and has for its object to provide a simple construction more particularly of the blade root the fixing of which is facilitated. The improved blade construction and manner of fixing are more especially intended for use in the stator members of compressors and turbines of the above type.

According to this invention, the improved blade has a root which in transverse section appears as four-sided but not rectangular and with one angle chamfered off, while in the length of the root there is an undercut part constituted by a notch which extends inwards from one side of the root, this notch being adapted to be engaged by a part of the member on which the blade is mounted. Where the blade is intended for use in a stator member it is provided at its outer end with a screw-threaded pin which projects in the direction of the length of the blade.

In fixing such a blade in either a rotor or stator member that member is formed with a cylindrical flange projecting from the member in the direction of its axis and in this flange are slots into each of which is placed the root of a blade which fits the slot with the lateral undercut notch in the root of the blade engaged by a part of the member adjacent to the slot therein. A part of this member at the side of the slot in it is then rolled over on to the chamfer at the angle of the root.

According to the method employed in fixing a blade as described above in the stator of an axial flow compressor or turbine, the stator member has concentric ring parts between which the blades are placed. The inner of these two ring parts has therein slots spaced apart and extending in the axial direction but inclined relatively to planes containing the axis and adapted to receive the roots of the blades, while the outer ring part has radial holes through it with each hole radially opposite to a slot in the inner ring part. The root of each blade fits into the slot in the inner ring part of the stator with the undercut part of the blade root lying beneath an adjacent part of the stator ring while the threaded pin at the end of the blade lies in one of the holes in the outer ring part of the stator. The inner ring part at one side of the slot in which each blade lies is then rolled over on to the chamfered part of the root and a nut is screwed on to the pin at the outer end of the blade. This nut lies in the hole in the outer ring part of the stator and is there fixed by suitable means against slacking back.

The accompanying drawings illustrate the invention more in detail and show by way of example how it may be carried out in practice. In these drawings, Figure 1 is an elevation of the improved blade as viewed from one side.

Figure 2 is also an elevation of the blade but as seen when looking at one edge thereof.

Figure 3 is a section through the blade on the line 3—3 in Figure 1 looking in the direction of the arrows.

Figure 4 is an elevation with a portion in section showing a part of a ring member, for instance of a stator, in which the blades are mounted and the manner of fixing the blades in place.

Figure 5 is a section on the line 5—5 in Figure 4 looking in the direction of the arrows.

Figure 6 is an elevation showing a part of a stator ring with the blades mounted therein.

Figure 7 is a transverse section on the same scale as Figures 1 and 2 and on the line 7—7 in Figure 6 showing in detail the disposition of a blade in the stator ring.

Referring to Figures 1, 2 and 3, the blade A which is of normal shape in section, has at one end the root B and at the other end a screw-threaded pin C. The root B is four-sided as seen in section or end view and as it appears in Figure 3 and has the shape of a rhomboid with the two opposite sides or faces D, $D^1$ parallel and longer than the other two sides E, $E^1$ which are also parallel but lie at an angle to the faces D, $D^1$. The angles between these side faces D, $D^1$ and the short sides E, $E^1$ may be designated as $a$ the angle which is larger than 90°, and $b$ the angle which is smaller than 90°. When a blade is in position, for example, in a stator ring, the side faces D, $D^1$ of the roots lie at an angle with planes containing the axis of the ring. This may be seen in Figure 4. On the other hand the short sides E, $E^1$ lie in two planes normal to the axis of the ring. At one of the angles $a$ between the side face D and the shorter side E there is a chamfer F which removes a part of the angle leaving this portion with the appearance seen in Figures 2 and 4. The lesser side E where is the chamfer has a shoulder $E^2$ between this part of the root and the adjacent end of the blade A the shoulder in effect forming a lug which when the blade is in place projects slightly in the axial direction as may be seen in Figures 1 and 5. In the lesser side $E^1$ is a notch or recess $E^3$ with a width in the direction of the length of the blade which is approximately equal to one-half of the measurement of the root in that direction as may be seen in Figure 1, while the depth of the notch, that is its measurement in a direction transverse to the length of the root and blade approximates to one-third of the distance between the parallel sides E and E¹. The bottom of each notch E³ may be at right angles to its sides E⁴ or inclined thereto so as to be parallel to the plane in which lie the surfaces of the shorter sides E¹ of the roots when the blades are in place in the stator ring.

The stator ring in which by way of example the blades will be described as mounted and fixed, is shown in end elevation in Figure 6 and in part in Figures 4, 5 and 7. This stator comprises an inner ring G and an outer ring H and in the inner ring are fixed the roots of the blades and in the outer ring lie and are held the pins C at the outer ends of the blades. The ring G of which the main part in which the blades are mounted lies in a plane normal to the axis of the ring, has a flange G¹ which projects in the axial direction. The thickness of this flange is equal to the radial width of the notch E³, that is the distance between the sides E⁴ of the notch. In the flange G slots G² are cut from the free edge G³ of the flange nearly up to the ring G. Each of these slots, as may be seen in Figure 4, has parallel sides and these sides are inclined with respect to planes containing the axis of the stator. The formation of each slot corresponds to the above described rhomboid formation of the blade roots B as the latter are seen in cross section or end view, so that each blade root will exactly fit into a slot and when a blade root is in a slot the notch E³ in the root will engage a part of the flange G¹ at the inner end of the slot, and the short side E¹ of the root will butt up against the face of the stator ring G as may be seen in Figures 5 and 7. The chamfered short side E of the root then lies just within the edge G³ of the flange G¹ between adjacent slots. After all the blades have been placed in position with their roots in the slots in the flange G¹ they will appear as seen in Figure 4. The edge G³ of the flange is then subjected to pressure by a suitable rolling tool such as J, shown diagrammatically in Figures 4 and 5, and this tool presses down the flange edge into the space provided by the chamfer F. This rolling or spinning over of the metal at the edge of the flange effectually prevents the withdrawal of the blade root from the slot in the stator ring.

This rolling or spinning may be effected in various ways but a convenient method is to mount the stator or other member in which the blades have been placed on a face plate with a roller tool arranged so that by rotation of the face plate relatively to the tool, which is carried on a central tool post, or by rotation of the tool over the stator ring on a stationary face plate, the requisite pressure can be applied to the tool which will then spin over the metal in the required manner and lock all the blades in their respective slots.

In the case where the improved blades are mounted in the stator member of an axial flow compressor or turbine it is usual for the outer end of each blade to be carried in an outer ring member of the stator. The arrangement then adopted is illustrated in Figures 6 and 7. The outer ring is in effect a separate structure and as is the usual practice with the stator itself is formed in two similar semicircular portions as indicated in Figure 6. In the outer ring H are a series of circular holes each having an outer part H¹ of larger diameter and an inner part H² of lesser diameter with a shoulder H³ between these parts. All the holes run in a radial direction through the thickness of the ring H and the centres of these holes are spaced equally apart in the circumferential direction this spacing corresponding to the circumferential spacing of the blades as mounted in the manner described above in the inner ring G of the stator. As already mentioned and as shown in Figures 1 and 2 each blade A has at its outer end a screwthreaded pin C. When a blade is in place with its root lying in a slot G² in the inner ring G of the stator the pin C will lie in the centre of a hole H¹, H² in the outer ring H. In each hole the shoulder H³ between the two parts H¹ and H² of different diameter is positioned about halfway through the thickness of the ring H. A nut K shaped externally to fit the two parts H¹, H² of the hole is then screwed on to the pin C and down on to the shoulder H³ the outer face of this nut being formed with a notch or the like adapted to be engaged by a suitable tool by means of which the nut is screwed home. It is then conveniently locked against risk of slacking back in one or both of the following ways. First blows with a suitably formed tool burr over inwards the edge of the metal around the end of the outer part H¹ of the hole so that the metal thus struck inwards will enter into the notch or like indentation in the face of the nut and thereby prevent its rotation. Secondly by means of another suitably shaped tool the thread on the end of the pin C is deformed.

With blades mounted and fixed in the manner described above the formation of the blades A is simple and fixing is easily effected and in a manner which enables the blades to be held rigidly in their correct angular positions especially when mounted between inner and outer stator rings.

What I claim as my invention and desire to secure by Letters Patent is:

1. A blade assembly for a turbo machine of the axial flow type comprising a supporting member in the form of a ring having angularly extending peripheral slots, a circular series of blades each having a root which in transverse section is four-sided but not rectangular the opposite sides being parallel, two of these opposite sides having a substantially greater length than the other two opposite sides, two of the opposite and equal angles respectively being greater than a right angle and the other two opposite and equal angles being less than a right angle, one of the angles which is greater than a right angle being chamfered off down the adjacent longer side, and an undercut part in the length of the root constituting a notch extending inwards from that one of the shorter sides of the root which is remote from the said chamfered off angle, this notch being adapted to be engaged by a deformed part of the ring member on which the blade is mounted, the root of each blade lying and fitting in one of the slots formed in the said ring member an adjacent part of which at the outer end of the slot has the metal projecting over onto and engaging the said chamfered off part of the blade root.

2. A blade assembly for a turbo machine of the axial flow type comprising a supporting member including an axially extending flange into the free edge of which extend spaced parallel-sided slots each open at one end and each adapted to receive a blade root, a series of blades each having a parallel-sided root portion approximately the width of each of the slots so as to fit closely within a slot, except that the edge of the root which lies adjacent to one side of the open end of the slot is formed with a chamfer, the metal of the flange adjacent to the chamfer being in firm engagement with the chamfer to hold the root in place in its slot.

3. A blade assembly for a turbo machine as claimed in claim 2, in which the cross-section of each blade root is that of a non-rectangular parallelogram, each slot is inclined at such an angle to the axis of the supporting member that the exposed end of each blade root lies in a plane normal to such axis, and the chamfer on each blade root is at the edge of the root which if of complete parallelogram cross-section would be represented by one of the obtuse angles of the parallelogram.

4. A blade assembly for a turbo machine as claimed in claim 3, in which the sides of each blade root which lie in contact with the sides of a groove in the supporting member are substantially longer than the two other sides.

5. A blade assembly for a turbo machine as claimed in claim 2, in which the sides of each blade root which lie in contact with the sides of a groove in the supporting member are substantially longer than the two other sides.

THOMAS CHARLES GILES.

REFERENCES CITED

The following references are of record in the file of this patent:

UNITED STATES PATENTS

| Number | Name | Date |
| --- | --- | --- |
| 612,598 | Wanless | Oct. 18, 1898 |
| 933,379 | Ljungstrom | Sept. 7, 1909 |
| 995,367 | Patitz | June 13, 1911 |
| 1,345,678 | Kasley | July 6, 1920 |
| 1,347,327 | Dickinson | July 20, 1920 |
| 1,640,451 | Junggren | Aug. 30, 1927 |
| 2,299,429 | Rydmark | Oct. 20, 1942 |
| 2,315,641 | Mosser | Apr. 6, 1943 |

FOREIGN PATENTS

| Number | Country | Date |
| --- | --- | --- |
| 149,843 | Great Britain | Aug. 26, 1920 |